Aug. 29, 1933.　　　　J. B. SEMON　　　　1,924,886
GAUGE COCK OR VALVE
Filed July 6, 1931　　　　3 Sheets-Sheet 1
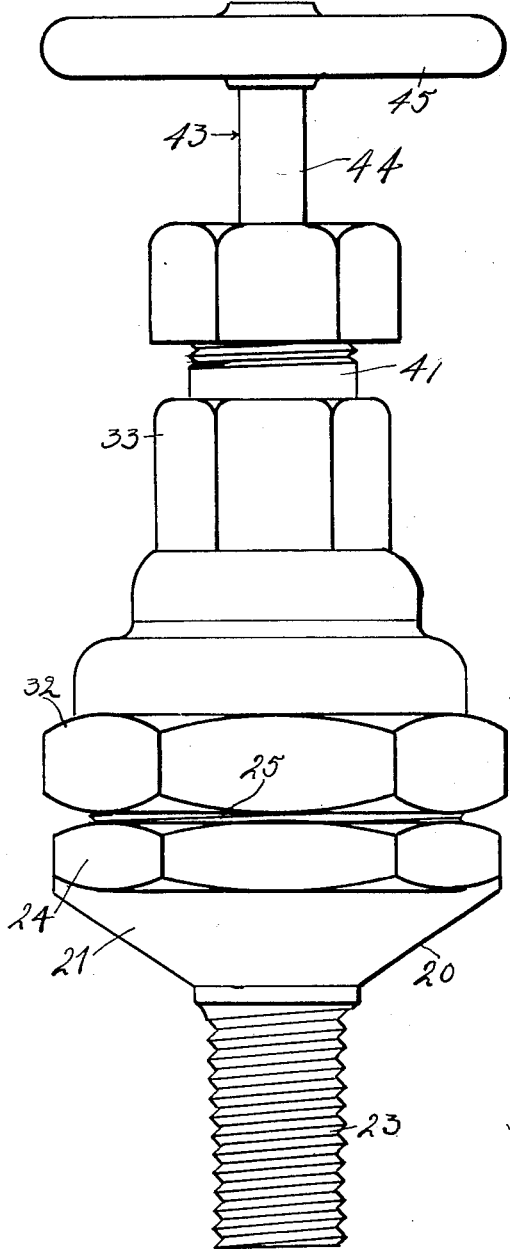
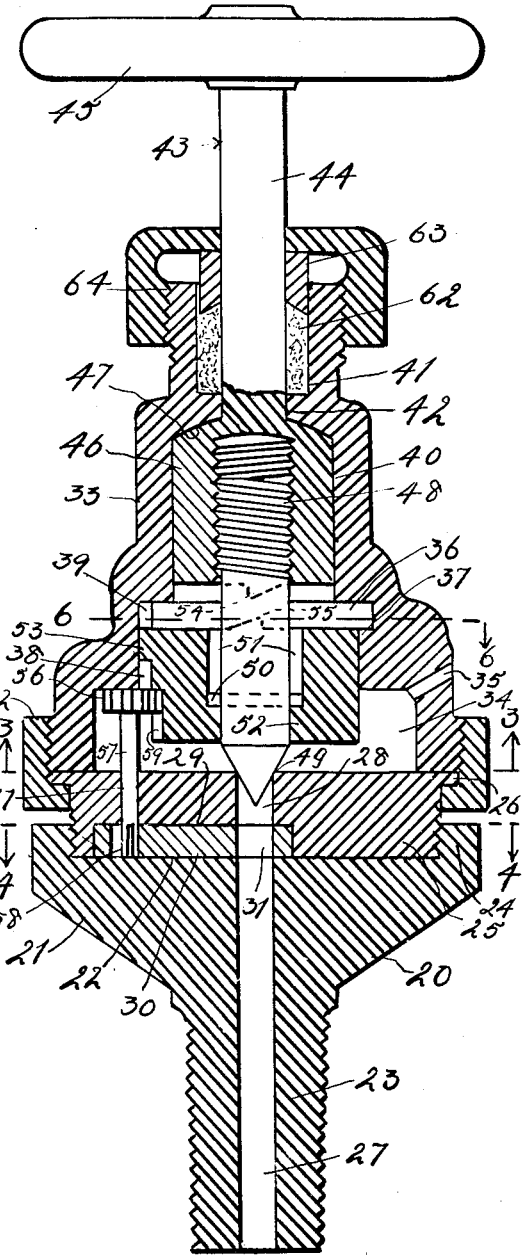
INVENTOR
John B. Semon

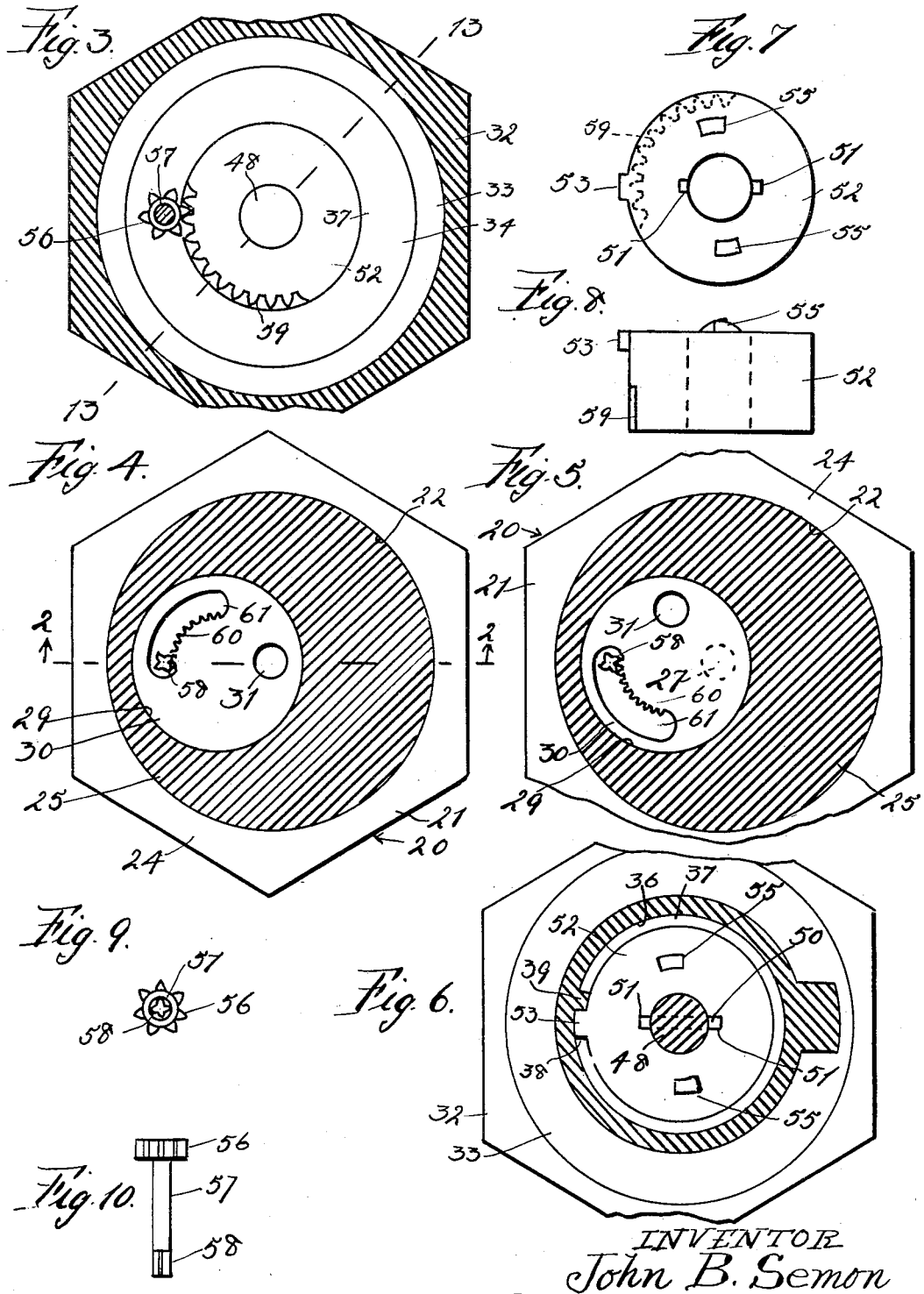

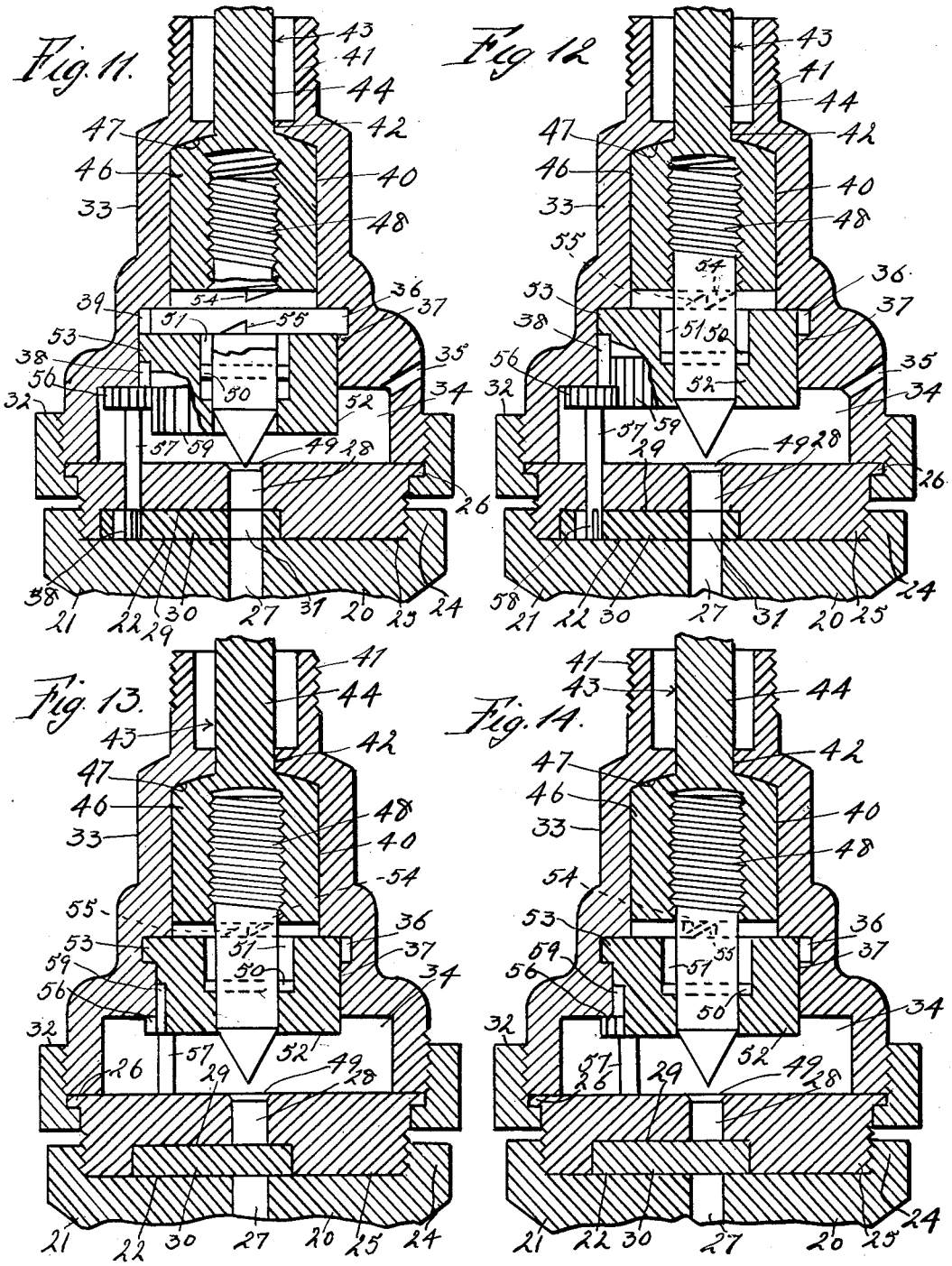

Patented Aug. 29, 1933

1,924,886

UNITED STATES PATENT OFFICE 1,924,886

GAUGE COCK OR VALVE

John B. Semon, Philadelphia, Pa.

Application July 6, 1931. Serial No. 548,902

7 Claims. (Cl. 277—31)

My invention relates to new and useful improvements in a gauge cock or valve, and has for one of its objects to generally improve the construction of devices of this kind wherein the valve stop or plug may be readily and quickly removed for grinding said valve stop and plug and its seat without having to shut off any valves or without draining the water from the article to which the gauge cock or valve is connected.

Another object of the invention is to provide a gauge cock or valve structure which makes it easy to grind the valve stop or plug and its seat.

Another object of the invention is to provide for shutting off the communication between the inlet and outlet of the gauge cock or valve upon giving an extraordinary opening movement to the valve stop or plug.

Another object of the invention is to provide for reopening the communication between the inlet and outlet of the gauge cock or valve after the parts have been replaced and the valve stop or plug has been moved toward its closing position but prior to the said valve stop or plug reaching its closed position.

Another object of the invention is to provide a device of this kind which requires little or no packing, the same being made non-leakable by ground joints.

A further object of the invention is to provide unique means for transmitting motion from the stopper to the disc closure or cut-off.

A further object of the invention is to provide a gauge cock or valve including a body having a housing connected thereto for enclosing a disc closure or cut-off which will control the passageway through the body or control the communication between the inlets and outlets of the device, said disc closure or cut-off being actuated through the medium of gears on a shaft journalled in the housing with one of the gears meshing with teeth on the cut-off and the other meshing with teeth on a collar mounted upon the valve stopper and controlled thereby under some conditions and also controlled directly by the operating handle under certain other conditions and said collar being limited in the amount and kind of movements it can make.

With these and other ends in view, this invention consists in the details of construction and combination of elements hereinafter set forth and then specifically designated by the claims.

In order that those skilled in the art to which this invention appertains may understand how to make and use the same, I will describe its construction in detail, referring by numerals to the accompanying drawings forming a part of this application, in which:—

Fig. 1 is a side elevation of a gauge cock or valve embodying my invention.

Fig. 2 is a longitudinal sectional view thereof on the line 2—2 of Fig. 4 with some of the parts left in elevation.

Fig. 3 is a section on the line 3—3 of Fig. 2.

Fig. 4 is a section on the line 4—4 of Fig. 2 with the disc closure or cut-off in an open position.

Fig. 5 is a similar fragmentary view with the disc closure or cut-off in a closed position.

Fig. 6 is a fragmentary view on the line 6—6 of Fig. 2.

Fig. 7 is an upper or outer end or face view of the collar.

Fig. 8 is a side elevation thereof.

Fig. 9 is an end view of the gear and pinion member for transmitting motion from the collar to the cut-off looking at the lower end of Fig. 10.

Fig. 10 is a side elevation thereof.

Fig. 11 is a fragmentary view similar to Fig. 2 but showing the stopper open.

Fig. 12 is a view like Fig. 11 after the collar has moved outward.

Fig. 13 is a fragmentary sectional view on the line 13—13 of Fig. 3 which is at about forty-five degrees relative to the views illustrated in Figs. 11 and 12 and showing the position of the parts after the cut-off has been closed.

Fig. 14 is a view similar to Fig. 13 but with the ratchets on the operating handle and collar in reversed positions.

In carrying out my invention as herein embodied, 20 represents the body of the gauge cock or valve including a head 21 having a recess 22 in its inner face and a shank 23 externally threaded whereby the device may be mounted on an article where it is to be used, for example, a water gauge.

The formation of the recess 22 produces a flange 24 which is internally threaded for the reception of the externally threaded plate 25, the latter having a flange 26 at its outer end for a purpose to be presently described.

A bore 27 extends through the body while a similar bore 28 is formed through the center of the plate 25 and aligns with the bore 27 and in the inner face or end of the said plate 25 is formed a circular recess, chamber or cavity 29 which is eccentric to the plate, as a whole, so that said chamber projects across, intersects or communicates with the bore 28 and with the plate in place the said recess, chamber or cavity communicates with the bore 27. While the bore 28 is concentric relative to the plate, being in its center, said bore is eccentric to the recess, chamber or cavity 29.

Within the recess, chamber or cavity 29 is revolvably mounted a disc closure or cut-off 30 having an eccentric hole 31 therethrough which can be moved into and out of alignment with the bores 27 and 28 and when in such alignment the passageway including said bores 27 and 28 and the hole 31 is free for the passage of fluid but when the cut-off is rotated a short distance the hole 31 will be moved out of alignment with said bores 27 and 28 and a solid portion of the cut-off will be disposed across the passageway including the two bores thus closing said passageway to the passage of fluid therethrough. The cut-off may be rotated in various ways but one method will be hereinafter described.

A union nut 32 is connected with the plate 25 and engages the flange 26 on said plate for anchoring purposes and said union nut has threaded engagement with the hood 33 to removably connect the same with the body of the device. The hood is fashioned so that its inner end, or at the lower end as illustrated in Fig. 2, is provided with an exhaust chamber 34 which is in communication with the passageway formed by the bores 27 and 28 and the hole 31 and with an outlet 35 through one of the walls of the hood. Just beyond the exhaust chamber 34, or outward therethrough, the interior of the hood is reduced in size and then enlarged to produce a groove 36 with a rib 37 between said groove and the exhaust chamber 34 and across this rib is formed a lateral key way 38 and across the groove 36 to one side of the key way 38 is a stop 39, one face of which aligns with or forms a continuation of one of the sides of the key way.

To the rear of the groove 36 the interior of the hood is further reduced in size to provide a socket receiving chamber 40 while at the extreme outer end is formed a stuffing box 41 which is in communication with the socket receiving chamber 40 through an opening 42 designed to receive a part of an operating handle 43.

The operating handle may be of any desirable configuration but should include a stem 44 on the outer end of which is mounted any suitable means, such as a wheel 45 for rotating the operating handle while at the inner end of said handle is an internally threaded socket element 46 which is positioned in the socket receiving chamber 40 and where the end of said socket element 46, which joins with the handle engages the contiguous wall of the socket receiving chamber a ground joint 47 is formed.

The socket 46 has threaded connection with the valve stopper or plug 48 which may be of any suitable or desirable construction but for convenience of illustration only it is here shown similar to a needle valve or a straight round rod like element having a tapered seating end which coacts with the valve seat 49 formed in the outer face of the plate 25 and surrounding the bore 28. While said seat 49 is at the outer end or face of the plate 25 said seat is at the inner end of the passageway formed by the bores 27 and 28.

The stopper 48 is provided with a spline 50 which, for convenience of illustration, is shown as a pin passing laterally through the stopper with the ends of the pin projecting beyond the surface of the stopper and registering with spline grooves 51 formed in a collar 52 which has a bore therethrough whereby the collar may be slidably mounted on the valve stopper. The collar 52 has a key 53 formed on its circumference at its rear or upper end so that under some conditions it may travel in the key way 38 and in other conditions it will travel in the groove 36, and when travelling in said groove in one direction will be stopped and caused to align with the key way 38 by the stop 39.

The threaded connection between the operating handle, or more particularly the socket 46 thereof, and the valve stopper 48 is by means of left hand threads so that when the operating handle is rotated in the usual or right hand direction for closing the valve, the valve stopper 48 will be moved inward toward its seat 49, the said valve stopper being moved longitudinally inwardly or threaded out of the socket 46 due to being held against rotation by the spline 50 cooperating with the spline grooves 51 in the collar when the key 53 of said collar is in the key way 38 to prevent rotation of said collar. The reverse operation of the operating handle will cause the valve stopper to move outward or away from its seat and into the socket 46.

The inner end of the socket 46 of the operating handle has any desirable number, preferably two, of ratchet teeth 54 projecting therefrom with the flat faces forward relative to the direction of travel of the ratchet teeth or the rotation of the operating handle when the latter is being operated for removing or backing the valve stopper from its seat or counter clock-wise and under the same conditions the beveled faces of said ratchet teeth are toward the rear. These ratchet teeth 54 are for cooperation with similar opposed ratchet teeth 55 on the outer or contiguous face of the collar 52 so that when said collar is moved outwardly whereby the ratchet teeth 55 will be in the path of travel of the ratchet teeth 54 the collar will be moved in the direction of rotation of the operating handle either away from or toward the key way 38, it being understood that the key 53 is in registration with the groove 36 when the collar is moved outward, and when the movement of the collar is such that the key 53 is travelling toward the key way 38 as soon as the key 53 strikes the stop 39 the further rotation of the operating handle will cause the ratchet teeth 55 to ride under the ratchet teeth 54 and therefore the collar will be forced inwardly so that the key 53 will enter the key way 38.

It is the rotation of the collar 52 that causes the rotation of the cut-off 30 and may be accomplished by a gear and pinion member consisting of a gear 56 on one end of a shaft 57 and a pinion 58 on the opposite end of said shaft, said pinion preferably being cut on or into the shaft so as to be no larger than the latter. Of course, the entire gear and pinion member as shown in Fig. 10, might be made from one piece of material.

Said gear and pinion member is journalled, through the medium of its shaft, in the plate 25 so that the pinion 58 is located within the cavity 22 while the gear 56 is located within the exhaust chamber 34. The gear 56 meshes with a gear 59, preferably of the segmental type, formed on or carried by the collar 52 and the teeth of said gear 59 are of sufficient length to permit the necessary movement of the collar without disengaging from the gear 56. The pinion 58 meshes with a gear or gear element 60 formed on or carried by the disc closure or cut-off 30 and said gear or gear element is preferably of the segmental type and located within the confines of an arcuate slot 61 produced in the cut-off 30. From this it will be obvious that the rotation of the collar 52 will rotate the cut-off 30 by the motion being transmitted through the gear of gear element 59, the gear 56, shaft 57, pinion 58, and the gear or gear element 60.

While it may not be essential due to the provisions of the ground joint 47, I prefer to pack the operating handle to positively prevent any leakage and therefore I have shown a packing 62 in the stuffing box 41 and held in place by a follower 63 which, in turn, is held in place by the gland nut 64 having threaded connection with the outer end of the hood.

For a description of the operation it will be assumed that the gauge cock or valve is attached to a steam or water gauge of a boiler. To make a test, the operating handle 43 is rotated counter clock-wise and since the valve stopper cannot rotate therewith said valve stopper will be moved outwardly by threading into the socket 46 whereby the valve stopper will be unseated and the fluid may flow from the object on which the valve is mounted through the bore 27, hole 31, bore 28, exhaust chamber 34 and the outlet 35. A reverse operation will again seat the valve stopper.

When it becomes necessary or it is desirable to regrind the valve stopper and its seat, said valve stopper is first withdrawn from its seat as above stated and when withdrawn a sufficient distance that the pressure will be built up in the exhaust chamber 34 due to the area of the outlet 35 being smaller than the passageway formed by the bores 27 and 28 and the hole 31, so as to move the collar 52 outwardly to disengage the key 53 from the key way 38 or move said key into the groove 36. This outward movement of the collar 52 will position the ratchet teeth 55 on said collar in the path of travel of the ratchet teeth 54 on the socket of the operating handle and therefore the continued counter clock-wise movement of the operating handle will cause the collar 52 to move with said operating handle in the same direction. The rotary movement of the collar will cause motion to be transmitted therefrom through its gear or gear element 59 to the gear 56, shaft 57, and pinion 58 and thence through the gear or gear element 60 to the cut-off 30 so that the latter will be rotated and cause the opening 31 to move away from the bores 27 and 28 and dispose a solid portion of the cut-off 30 across or between said bores thereby closing the passageway consisting of the bores 27 and 28 and the opening or hole 31. This is especially true due to the ground joints between the cut-off 30 and the body and plate 20 and 25, respectively.

The passageway through the body of the device being closed the union nut 32 may be backed off and the hood with its component parts removed from the body of the valve thereby exposing the seating end of the valve stopper and its seat for the application of abrasive material and for carrying out the grinding operations.

As soon as the valve stopper and its seat have been reground the hood is replaced and the operating handle then rotated clock-wise in the manner for closing the valve. This operation will cause the beveled faces of the ratchet teeth 54 and 55 to come in contact with each other and the collar 52 will be rotated until the key 53 thereof contacts with the stop 39. The key 53 then being in alignment with the key way 38, continued rotation of the operating handle will cause the ratchet teeth 54 to push inward on the ratchet teeth 55 so that the latter will ride under the former and move the entire collar inward with the key 53 entering the key way 38. The reverse rotation of the collar will transmit a reverse movement to the cut-off 30 and as soon as the key 53 engages the stop 39 the hole 31 will be in alignment with the bores 27 and 38 so as to again open the passageway through the body.

The collar being held against further rotation, the continued movement of the operating handle will screw the valve stopper inward toward its seat finally bringing said valve stopper in actual engagement with the valve seat to close the valve.

Of course, I do not wish to be limited to the exact details of construction herein shown and described as these may be varied within the limits of the appended claims without departing from the spirit of my invention.

Having thus fully described my invention, what I claim as new and useful is:—

1. A gauge cock or valve consisting of a body having a passageway therethrough, a valve seat at the inner end of said passageway, a rotatable cut-off intersecting said passageway and having a hole therein for selective registration with the passageway, a hood removably connected to the body and provided with an outlet, an operating handle rotatably mounted in said hood, a valve stopper having threaded connection with the handle for longitudinal movement, a collar having a non-rotatable sliding connection with the stopper and a sliding and rotating connection with the hood, interengaging means on the operating handle and collar whereby rotary motion may be imparted from the operating handle to the collar, and means for transmitting rotary motion from said collar to the cut-off.

2. A gauge cock or valve consisting of a body having a passageway therethrough with a valve seat at the inner end of said passageway, a hood removably mounted on the body and provided with an outlet, a valve stopper for coaction with the valve seat, means to actuate said stopper longitudinally, means keyed to the stopper and hood to prevent rotation of either said means or stopper, said hood having a groove to permit rotation of said normally keyed means when moved to its extreme outer position, means to temporarily connect the stopper actuating means and the normally keyed means when the latter is in its rotatable position for simultaneous rotation, a cut-off to control the passageway through the body, and means to transmit motion from the normally keyed means when in its rotatable position to the cut-off.

3. A device of the kind described including a body proper having a passageway therethrough, a plate removably mounted on said body and having a passageway therethrough registering with the passageway in the body proper and said plate further having a recess in its inner face and communicating with the passageways, a cut-off mounted in the recess between the plate and body proper and having a hole therethrough for selective registration with the passageways, said cut-off controlling the flow of fluid through the passageways, a valve seat surrounding the passageway in the plate, a hood removably mounted on the body and having an outlet, a stopper, an operating handle for said stopper and means whereby motion may be transmitted from the operating handle to the cut-off.

4. A gauge cock or valve consisting of a body including a body proper and a plate removably mounted on said body proper, said body having a passageway therethrough and a recess communicating with said passageway, a valve seat at the inner end of the passageway, a hood removably connected with the body and provided with an outlet, a valve stopper for coaction with the valve seat, a cut-off in the recess to control the passageway, and means to actuate the valve stopper and the cut-off whereby the passageway will be closed and reopened during the opening and closing operations of the valve stopper and at a time when said valve stopper is in its substantially full open position.

5. A gauge cock or valve comprising a body proper having a bore therethrough and provided with a recess concentric with said bore, a flanged plate removably mounted in the recess in the body and provided with a bore in endwise alignment with the bore of the body and further provided with a recess in its inner face which recess communicates with the bores, a valve seat at the outer end of the bore through the plate, a hood provided with an outlet, a union nut coacting with the flanged plate and said hood for removably mounting the latter in place, an annular rib within the hood having a lateral key way and defining a groove in communication with the key way, a stop in said groove to one side of the key way, a collar within the hood, a key on said collar for registration with the key way and groove and when in the key way permitting only sliding movement of the collar and when in the groove permitting only rotary movement of the collar limited by the stop in said groove, a valve stopper for coaction with the seat and splined to the collar, an operating handle for moving the valve stopper longitudinally toward and away from its seat, companion means on the operating handle and collar whereby rotary motion may be imparted from said handle to the collar when the key of the latter is in the groove, a cut-off rotatably mounted in the recess in the plate for controlling the passageways, and means whereby rotary motion may be transmitted from the collar to the cut-off when the key of said collar is in the groove.

6. A gauge cock or valve comprising a body proper having a bore therethrough and provided with a recess concentric with said bore, a flanged plate removably mounted in the recess in the body and provided with a bore in endwise alignment with the bore of the body and further provided with a recess in its inner face which recess communicates with the bores, a valve seat at the outer end of the bore through the plate, a hood provided with an outlet, a union nut coacting with the flanged plate and said hood for removably mounting the latter in place, an annular rib within the hood having a lateral key way and defining a groove in communication with the key way, a stop in said groove to one side of the key way, a collar within the hood, a key on said collar for registration with the key way and groove and when in the key way permitting only sliding movement of the collar and when in the groove permitting only rotary movement of the collar limited by the stop in said groove, a valve stopper for coaction with the seat and splined to the collar, an operating handle for moving the valve stopper longitudinally toward and away from its seat, interengageable ratchet teeth on the operating handle and collar which teeth will be in engagement and permit imparting a rotary movement from the operating handle to the collar while the key of the latter is in the groove, a rotatable cut-off having a hole therethrough for selective registration with the passageways to control the latter, a gear element on the cut-off, a gear element on the collar, a shaft journalled in the plate, a gear on one end of said shaft meshing with the gear element on the collar, and a pinion at the other end of said shaft meshing with the gear element on the cut-off whereby rotary motion may be transmitted from the collar to said cut-off.

7. The structure set forth in claim 6, wherein the valve stopper has a threaded portion and the operating handle has a threaded socket for connection with the valve stopper, said socket being mounted in the hood with a ground joint between the handle end of the socket and the contiguous surface of the hood, and the coacting flat faces of the cut-off and contiguous surfaces of the body and plate having ground joints between them.

JOHN B. SEMON.